United States Patent
Seshadri et al.

(10) Patent No.: US 9,014,727 B2
(45) Date of Patent: Apr. 21, 2015

(54) METHOD AND SYSTEM FOR UPDATING OBSOLETE RECORDS FOR REFERENCE POSITIONS IN A REFERENCE POSITION DATABASE

(75) Inventors: Nambirajan Seshadri, Irvine, CA (US); David Murray, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 742 days.

(21) Appl. No.: 12/753,678

(22) Filed: Apr. 2, 2010

(65) Prior Publication Data

US 2011/0202576 A1    Aug. 18, 2011

Related U.S. Application Data

(60) Provisional application No. 61/304,276, filed on Feb. 12, 2010.

(51) Int. Cl.
- *H04W 24/00* (2009.01)
- *H04B 1/38* (2006.01)
- *H04W 4/00* (2009.01)
- *G06F 17/30* (2006.01)

(52) U.S. Cl.
CPC ................................. *G06F 17/30578* (2013.01)

(58) Field of Classification Search
CPC ... G01S 5/0009; G01S 5/0018; G01S 5/0027; G01S 5/0036; G01S 5/02; G01S 5/0205; G01S 5/021; G01S 5/0236; G01S 5/0242; G01S 5/0252; G06F 17/30241; G06F 17/30575; G06F 17/30578; H04W 64/00; H04W 64/003; H04W 84/10; H04W 84/105; H04W 84/12; H04W 88/08

USPC ........ 455/404.2, 418–420, 435.1, 456.1–457, 455/561; 370/338
See application file for complete search history.

(56) References Cited

U.S. PATENT DOCUMENTS

| | | | |
|---|---|---|---|
| 2003/0006931 A1* | 1/2003 | Mages | 342/357.06 |
| 2004/0259575 A1* | 12/2004 | Perez-Breva et al. | 455/456.5 |
| 2005/0037775 A1* | 2/2005 | Moeglein et al. | 455/456.1 |
| 2006/0009235 A1* | 1/2006 | Sheynblat et al. | 455/456.1 |
| 2007/0121560 A1* | 5/2007 | Edge | 370/338 |
| 2009/0149197 A1* | 6/2009 | Morgan et al. | 455/456.1 |
| 2010/0159949 A1* | 6/2010 | Selgert et al. | 455/456.1 |
| 2011/0051658 A1* | 3/2011 | Jin et al. | 370/328 |
| 2011/0069627 A1* | 3/2011 | Sridhara et al. | 370/252 |

* cited by examiner

*Primary Examiner* — Michael Mapa
(74) *Attorney, Agent, or Firm* — Sterne, Kessler, Goldstein & Fox PLLC

(57) ABSTRACT

A mobile device communicates position samples of one or more reference position with respect to one or more other communication device such as access points to a location server communicatively coupled to a reference database. The location server determines whether to utilize the one or more reference position in the reference position database based on the communicated samples. The mobile device scans the position samples, which indicate position information of the one or more other communication device and/or whether the position information is reliable for use. The scanned position samples are accumulated and transmitted to the location server. The location server updates records for the one or more reference positions with respect to the one or more other communication device in the reference position database based on the accumulated position samples received. The updated records are utilized to determine a fast position fix for the position device.

21 Claims, 4 Drawing Sheets

METHOD AND SYSTEM FOR UPDATING OBSOLETE RECORDS FOR REFERENCE POSITIONS IN A REFERENCE POSITION DATABASE

CROSS-REFERENCE TO RELATED APPLICATIONS/INCORPORATION BY REFERENCE

This patent application makes reference to, claims priority to and claims the benefit from U.S. Provisional Patent Application Ser. No. 61/304,276 filed on Feb. 12, 2010.

This application makes reference to:
U.S. application Ser. No. 12/394,416 filed on Feb. 27, 2009.

Each of the above stated applications is hereby incorporated herein by reference in its entirety.

FIELD OF THE INVENTION

Certain embodiments of the invention relate to communication systems. More specifically, certain embodiments of the invention relate to a method and system for updating obsolete records for reference positions in a reference position database.

BACKGROUND OF THE INVENTION

Location based services (LBS) are emerging as a new type of value-added service provided by mobile communication network. LBS are mobile services in which the user location information is used in order to enable various LBS applications such as, for example, enhanced 911 (E-911) services. A position of a mobile device is determined in different ways such as, for example, using network-based technology, using terminal-based technology, and/or hybrid technology (a combination of the former technologies). Many positioning technologies such as, for example, Cell of Origin (COO), Time of Arrival (TOA), Observed Time Difference of Arrival (OT-DOA), Enhanced Observed Time Difference (E-OTD) as well as the satellite-based systems such as the Global Navigation Satellite Systems (GNSS), and/or Assisted-GNSS (A-GNSS), are in place to estimate the location of the mobile device and convert it into a meaningful X, Y coordinate for LBS applications. A GNSS used for the LBS applications may be, for example, the Global Positioning System (GPS), the Global Orbiting Navigation Satellite System (GLO-NASS), and the satellite navigation system GALILEO.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for updating obsolete records for reference positions in a reference position database, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for updating obsolete records for reference positions in a reference position database. In various embodiments of the invention, a mobile device is operable to communicate position samples of one or more reference position with respect to one or more other communication device such as access points and/or base stations to a location server. The location server is operable to determine whether to utilize the one or more reference position in a reference position database, which is communicatively coupled to the location server, based on the communicated samples for mobile locating according to the position samples received. The mobile device scans or captures the position samples of the one or more reference positions for the mobile device with respect to the one or more other communication device such as access points and/or base stations through encountered RF experiences. The scanned position samples may indicate position information of the one or more other communication device. The scanned position samples may also indicate whether the position information of the one or more other communication device is reliable for use. The mobile device is operable to accumulate the scanned position samples of the one or more reference positions and transmit the accumulated scanned position samples of the one or more reference positions to the location server periodically or aperiodically.

The location server is operable to update records for the one or more reference positions with respect to the one or more other communication device in the reference position database based on the accumulated position samples of the one or more reference positions. Based on the updated records, the location server may determine whether to remove, use, and/or keep the one or more other communication device in the reference position database. The location server is also operable to determine whether the one or more other communication device in the reference position database are fix-positioned or moving based on geographic information indicated in the received position samples for the updated records. The updated records may be utilized to determine a fast position fix for associated mobile devices.

Figure 1:
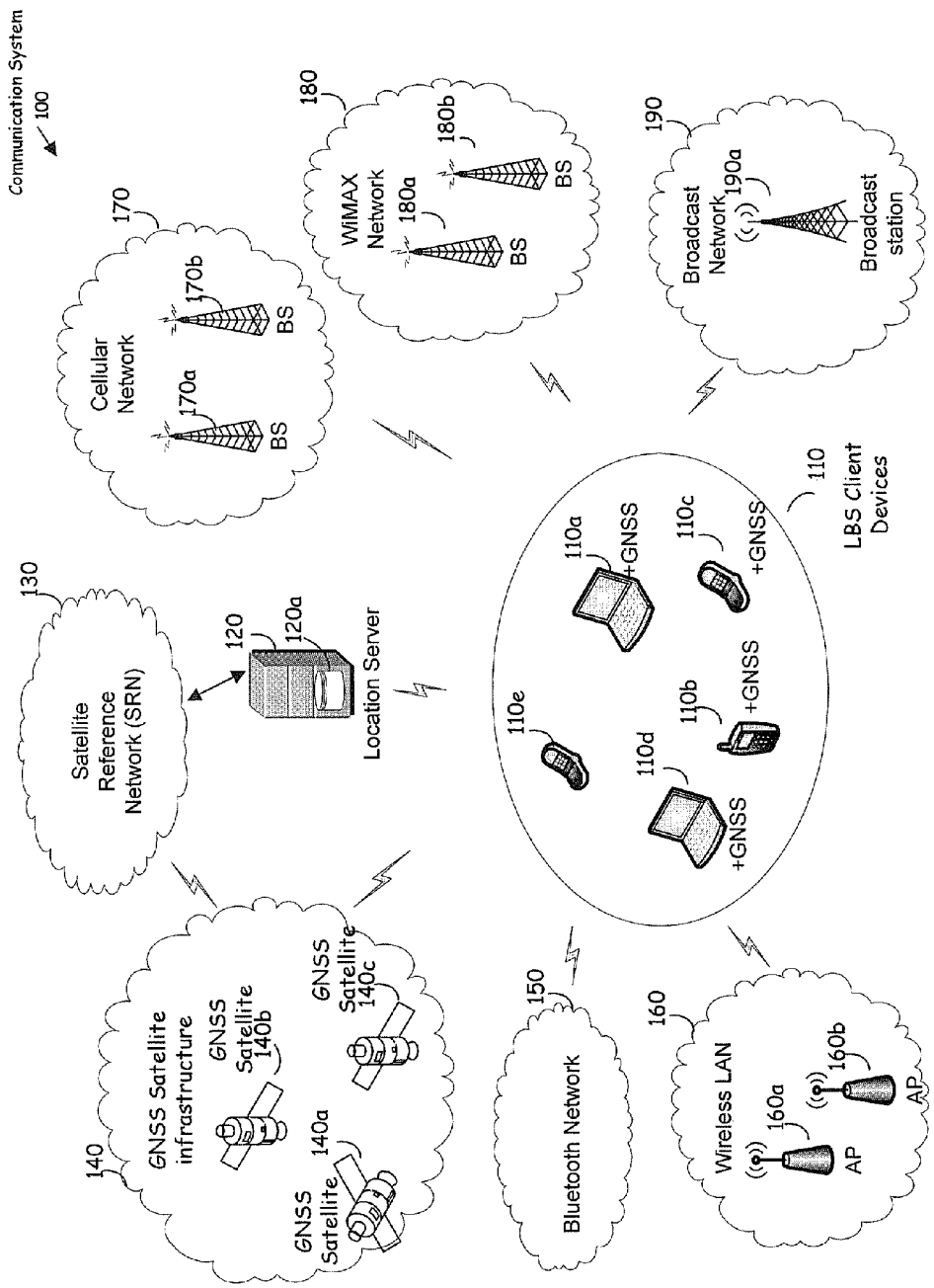
FIG. 1 is a diagram illustrating an exemplary communication system that is operable to update obsolete records for reference positions in a reference position database, in accordance with an embodiment of the invention.

FIG. 1 is a diagram illustrating an exemplary communication system that is operable to updating obsolete records for reference positions in a reference position database, in accordance with an embodiment of the invention. Referring to FIG. 1, there is shown a communication system 100. The communication system 100 comprises a plurality of mobile devices 110, of which mobile devices 110a-110e are illustrated, a location server 120 comprising a reference position database 120a, a satellite reference network (SRN) 130, a GNSS satellite infrastructure 140, a Bluetooth network 150, a wireless local access network (WLAN) 160, a cellular network 170, a Worldwide Interoperability for Microwave Access (WiMAX) network 180, and a broadcast network 190. The GNSS satellite infrastructure 140 comprises a plurality of GNSS satellites, of which GNSS satellites 140a-140c are illustrated. The WLAN 160 comprises a plurality of WLAN access points such as WLAN access points (APs) 160a and 160b. The cellular network 170 and the WiMAX network 180 comprise a plurality of base stations (BSs), of which base stations 170a-170b and base stations 180a-180b are illustrated, respectively. The broadcast network 190 comprises a plurality of broadcast towers such as a broadcast tower 190a.

A mobile device such as the mobile device 110a may comprise suitable logic, circuitry, interfaces and/or code that are operable to communicate radio frequency signals with one or more communication networks, for example, the Bluetooth network 150. Depending on device capabilities, the mobile device 110a may be operable to scan or capture position samples of reference positions for the mobile device with respect to various encountered reference position elements, namely, other communication devices such as, for example, the WLAN APs 160a-160b, the broadcast tower 190a, the BSs 170a-170b, and/or the BSs 180a-180b. The scanned position samples may comprise position information of reference position elements that the mobile device 110a encounters. In one embodiment of the invention, the scanned position samples may comprise information indicating whether position information associated with the encountered reference position elements is reliable or should not be used, for example, to refine or update records for corresponding reference positions in the reference position database 120a, which is integrated or coupled to the location server 120. In instances where the scanned position samples may indicate that position information associated with the encountered reference position elements may be reliable for use, the mobile device 110a may be operable to accumulate the scanned position samples for knowledge of position information of the encountered reference position elements. A confidence parameter and/or other metric may be determined and utilized to indicate, track and/or determine whether reference position elements may be reliable for use.

The mobile device 110a may be operable to communicate and/or report the accumulated position samples to the location server 120 so as to refine or update records for corresponding reference positions of the mobile device 110a with respect to one or more reference position elements, i.e., other communication devices, in the reference position database 120a. The accumulated position samples may be reported to the location server 120 periodically or aperiodically. In instances where the mobile device 110a may be a GNSS capable device, the mobile device 110a may be operable to receive GNSS radio frequency (RF) signals directly from visible GNSS satellites such as the GNSS satellites 140a-140c. The received GNSS RF signals may be used to calculate a position fix of the mobile device 110a. In this regard, the mobile device 110a may be operable to utilize corresponding reference positions with updated records in the reference position database 120a to achieve an accurate and fast position fix.

The location server 120 may comprise suitable logic, circuitry, interfaces and/or code that may be operable to retrieve location information for associated users such as mobile devices. The location server 120 may be operable to receive a plurality of position samples from associated mobile devices such as the mobile device 110a. Exemplary position samples reported from a mobile device such as the mobile device 110a may comprise position information of reference position elements, namely, other communication devices such as the AP 160a-160b and the BS 170a-170b that the mobile device 110a encounters or detects. The location server 120 may be operable to communicate information with mobile devices in exemplary formats compatible with telecommunication networks such as GSM/UMTS, WiMAX, Wi-Fi and/or Bluetooth. For example, the location server 120 may be GSM/UMTS standard compliant by supporting messaging in RRLP format, PCAP interface and/or OMA SUPLv1.0. Communication between the location server 120 and the mobile devices may occur via a user-plane (data traffic) and/or a control-plane (signaling).

In an exemplary embodiment of the invention, the location server 120 may be operable to determine position status of reference position elements according to corresponding position samples received or reported from mobile devices. In this regard, the location server 120 may be operable to determine whether positions of the reference position elements such as the AP 160a within the reference position database 120a may be changed, namely, removed or moved to different locations, according to characteristics such as, for example, availability and number, of the corresponding received position samples.

In another exemplary embodiment of the invention, the location server 120 may be operable to adaptively update or refine records for reference positions in the reference position database 120a according to the determined position status for the reference position elements. For example, for a specific reference position element such as the AP 160a in the reference position database 120a, in instances where position samples for the AP 160a may not be received or reported within a certain time period, the location server 120 may consider that records in the reference position database 120 for positions of the AP 160a are obsolete. The location server 120 may be operable to select other reference position elements with up-to-date records, instead of the AP 160a, as reference positions for mobile locating. The AP 160a may be removed from the reference position database 120a. In instances where position samples for the AP 160a may indicate that position information associated with the AP 160 is not reliable for use, the location server 120 may be operable to select other reference position elements, instead of the AP 160a, as reference positions for mobile locating. In this situation, the AP 160a may be removed from the reference position database 120a. In instances where there is not enough position samples are received or reported for the AP 160a within a certain time period, the location server 120 may consider that records for the position information of the AP 160a in the reference position database 120 are obsolete.

The location server 120 may not use the AP 160a as a reference position for mobile locating. In instances where enough position samples for the AP 160a are received or reported within a certain time period and consistent geographic information for the position of the AP 160a may be indicated in the corresponding received position samples, the location server 120 may determine that the AP 160a is in a fixed position. The location server 120 may be operable to use the AP 160a as a reference position for mobile locating. In instances where enough position samples for the AP 160a are received or reported within a certain time period, but different geographic areas for the position of the AP 160a may be indicated in the received position samples, the location server 120 may determine that the AP 160a is moving. The location server 120 may update the records for the position of the AP 160a in the reference position database 120a according to the received position samples.

A GNSS satellite such as the GNSS satellite 140a may comprise suitable logic, circuitry, interfaces and/or code that is operable to broadcast satellite navigational information to various GNSS receivers on earth. The GNSS receivers, which comprise GPS, GALILEO and/or GLONASS receivers, may be integrated internally to or externally coupled to GNSS capable communication devices such as the mobile devices 110a through 110d. The broadcast satellite navigational information such as ephemeris may be utilized to calculate, for example, a position, velocity, and/or clock information of the GNSS receivers. In this regard, positions of reference position elements with up-to-date records in the reference position database 120a may be utilized as reference positions to accelerate a position fix for the GNSS receivers.

The SRN 130 may comprise suitable logic, circuitry and/or code that may be enabled to collect and distribute data for GNSS satellites on a continuous basis. The SRN 130 may comprise a plurality of GNSS reference tracking stations located around the world to provide assistant-GNSS coverage all the time in both home network and visited network allowing users of GNSS enabled devices such as the mobile devices 110a through 110d to roam with associated LBS anywhere in the world.

The GNSS satellites 140a through 140c may comprise suitable logic, circuitry and/or code that may be operable to generate and broadcast satellite navigational information in suitable radio-frequency (RF) signals to various GNSS capable devices such as, the mobile devices 110a-110d.

The Bluetooth network 150 may comprise suitable logic, circuitry, interfaces and/or code that may be operable to provide data services to Bluetooth enabled mobile devices such as, for example, the mobile device 110a. The Bluetooth network 150 may be operable to communicate various data services such as a location-based service in Bluetooth RF signals via Bluetooth devices such as, for example, the mobile device 110a. In this regard, position information for corresponding peer Bluetooth devices indicated in the communicated Bluetooth RF signals may be accumulated and reported as position samples to the location server 120.

The wireless LAN 160 may comprise suitable logic, devices, interfaces and/or code that may be operable to provide data services to various wireless LAN enabled communication devices such as the mobile device 110b using wireless LAN technology. Exemplary wireless LAN technology may comprise, for example, IEEE Std 802.11, 802.11a, 802.11b, 802.11d, 802.11e, 802.11n, 802.11v, and/or 802.11u. The wireless LAN 160 may be operable to communicate various data services such as a location-based service (LBS) in WLAN RF signals via wireless LAN APs and WLAN capable devices such as, for example, the mobile device 110a. In this regard, position information for a corresponding serving access point indicated in the communicated WLAN RF signals may be accumulated and reported as position samples to the location server 120.

The cellular network 170 may comprise suitable logic, devices, interfaces and/or code that may be operable to provide data services to various associated mobile devices such as the mobile devices 110a-110e using cellular communication technologies. The cellular communication technologies may comprise, for example, Global System for Mobile communications (GSM), General Packet Radio Services (GPRS), Universal Mobile Telecommunications System (UMTS), Enhanced Data rates for GSM Evolution (EDGE), Enhanced GPRS (EGPRS), and/or 3GPP Long Term Evolution (LTE). The cellular network 170 may be operable to communicate various data services such as a location-based service in cellular RF signals via associated base stations such as the BS 170a with associated mobile devices such as, for example, the mobile device 110a. In this regard, position information for a corresponding serving base station, one or more neighbor base stations and/or one or more active base stations indicated in the communicated cellular RF signals may be accumulated and reported as position samples to the location server 120.

The WiMAX network 180 may comprise suitable logic, devices, interfaces and/or code that may be operable to provide data services to various associated mobile devices such as the mobile devices 110a-110e by using WiMAX technology. The WiMAX network 180 may be operable to communicate various data services such as a location-based service in WiMAX RF signals via associated base stations such as the BS 180a with associated mobile devices such as, for example, the mobile device 110a. In this regard, position information for a corresponding serving WiMAX base station, and/or one or more neighbor WiMAX base stations indicated in the communicated WiMAX RF signals may be accumulated and reported as position samples to the location server 120.

The broadcast network 190 may comprise suitable logic, circuitry and/or code that may be operable to allocate a single carrier frequency to broadcast programs for various associated mobile devices such as the mobile devices 110a-110e. The broadcast network 190 may be operable to transmit the broadcast programs in corresponding RF signals using various broadcast technologies such as, for example, FM, DAB, DVB-H, DVB-SH and/or DVB-T. In this regard, position information for a serving broadcast tower such as the broadcast tower 190a indicated in the communicated broadcast RF signals may be accumulated and reported to the location server 120.

In an exemplary operation, a mobile device such as the mobile device 110a may be operable to scan or capture position samples for various encountered reference position elements. The scanned position samples may comprise position information of the encountered reference position elements. The encountered reference position elements comprise various wireless nodes such as, for example, the WLAN APs 160a-160b, the broadcast tower 190a, the BSs 170a-170b, and/or the BSs 180a-180b. The scanned position samples for the encountered reference position elements may be accumulated and communicated to the location server 120.

The location server 120 may be operable to determine position status of the encountered reference position elements according to corresponding received position samples. Records for reference positions of corresponding reference position elements within the reference position database 120a may be adaptively refined or updated according to the received position samples. For example, records for a specific reference position element such as the AP 160a in the reference position database 120a may be updated or refined according to, for example, availability of position samples for the AP 160a within a certain time period, number of received position samples within the certain time period, and/or geographic information indicated in received position samples for the position of the AP 160a. Reference position elements in the reference position database 120a may be selected as reference positions for mobile locating based on the determined position status. Reference position elements with up-to-date records for corresponding position information in the reference position database 120a may be utilized as reference positions to achieve a fast and accurate position fix for, for example, the mobile device 110a, thereby, optimizing LBS performance.

Figure 2:
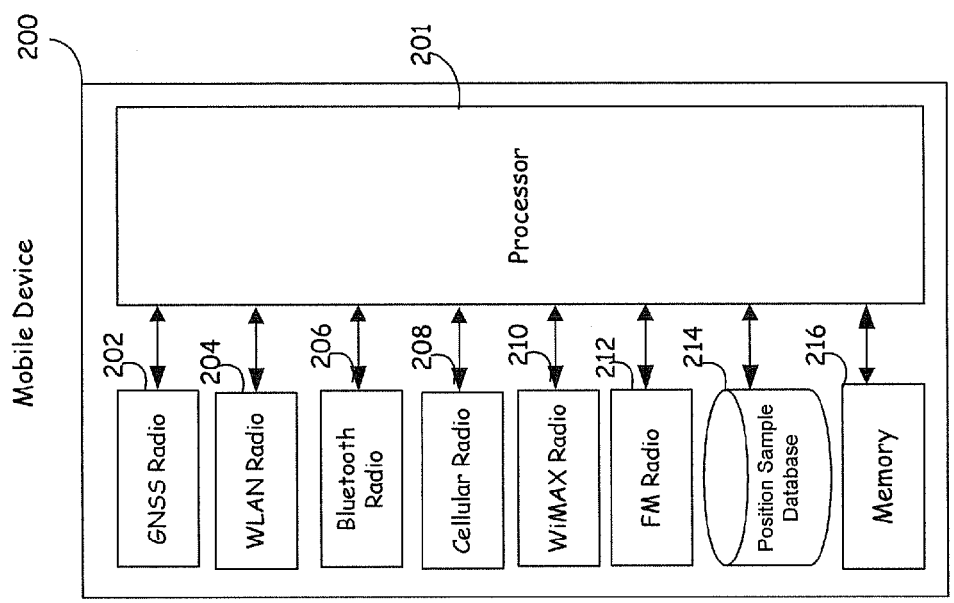
FIG. 2 is a block diagram illustrating an exemplary mobile device that is operable to scan position samples to be used for updating obsolete records for reference positions in a reference position database, in accordance with an embodiment of the invention.

FIG. 2 is a block diagram illustrating an exemplary mobile device that is operable to scan position samples to be used for updating obsolete records for reference positions in a reference position database, in accordance with an embodiment of the invention. Referring to FIG. 2, there is shown a mobile device 200. The mobile device 200 may comprise a processor 201, a GNSS radio 202, a WLAN radio 204, a Bluetooth radio 206, a cellular radio 208, a WiMAX radio 210, a FM radio 212, a position sample database 214 and a memory 216.

The processor 201 may comprise suitable logic, circuitry, interfaces and/or code that may be operable to manage and/or control operations of associated component units such as, for example, the GNSS radio 202, the WLAN radio 204, the Bluetooth radio 206, the cellular radio 208, the WiMAX radio 210, the FM radio 212, the position sample database 214 and/or the memory 216, depending on corresponding usages. For example, the processor 201 may be operable to activate or deactivate one or more associated radios such as the GNSS radio 204 and/or the cellular radio 208 as a needed basis to save power. The processor 201 may be operable to scan position samples for various encountered reference position elements, which may be, for example, the WLAN APs 160a-160b, the broadcast tower 190a, the BSs 170a-170b, and/or the BSs 180a-180b. The scanned position samples may comprise position information of the encountered reference position elements. The scanned position samples may indicate whether position information of the encountered reference position elements is reliable or not for use. In instances where the scanned position samples may indicate that position information associated with the encountered reference position elements may be reliable for use, the processor 201 may be operable to accumulate the scanned position samples for the encountered reference position elements and store in the position sample database 214.

The processor 201 may be operable to communicate or report the stored position samples to the location server 120 so as to refine and/or update records for positions of the corresponding reference position elements in the reference position database 120a. The processor 201 may be operable to communicate or report the stored position samples to the location server 120 periodically or aperiodically. In instances where the GNSS radio is activated, the processor 201 may be operable to receive GNSS radio frequency (RF) signals directly from visible GNSS satellites such as the GNSS satellites 140a-140c. The processor 201 may be operable to utilize the received GNSS RF signals to calculate a position fix of the mobile device 110a. In this regard, the processor 201 may be operable to utilize position information of one or more reference position elements with up-to-date records in the reference position database 120a for an accurate and fast position fix.

The GNSS radio 202 may comprise suitable logic circuitry, interfaces and/or code that may be operable to detect and track GNSS radio frequency signals that are received from visible GNSS satellites such as the GNSS satellites 140a-140c.

The WLAN radio 204 may comprise suitable logic circuitry, interfaces and/or code that may be operable to transmit and receive WLAN radio frequency (RF) signals. The WLAN radio frequency signals may be communicated in a format compatible with various WLAN standards such as, for example, IEEE Std 802.11, 802.11a, 802.11b, 802.11d, 802.11e, 802.11n, 802.11v, and/or 802.11u. The WLAN radio 204 may be operable to receive continuous, aperiodic, or periodic WLAN radio frequency signals from, for example, the WLAN AP 160a in the WLAN 160. In this regard, position information of a serving WLAN AP 160a such as the WLAN AP 160a indicated in the received WLAN RF signals may be scanned as position samples and stored in the position sample database 214. Position samples may be scanned continuously, aperiodically, or periodically. The scanned position information of the AP 160a may comprise actual position of the AP 160a and/or position related parameters such as, for example, an AP ID and/or the strength of the received WLAN RF signals.

The Bluetooth radio 206 may comprise suitable logic circuitry, interfaces and/or code that may be operable to transmit and receive Bluetooth radio frequency signals. The Bluetooth radio 206 may be operable to receive Bluetooth radio frequency signals from the Bluetooth network 150. In this regard, position information of one or more peer Bluetooth devices indicated in the received Bluetooth RF signals may be scanned as position samples and stored in the position sample database 214. Position samples may be scanned continuously, aperiodically, or periodically. The scanned position information of peer Bluetooth devices may comprise actual position of peer Bluetooth devices and/or position related parameters such as, for example, a Bluetooth address and/or the strength of the received Bluetooth RF signals.

The cellular radio 208 may comprise suitable logic, devices, interfaces and/or code that may be operable to transmit and receive wireless cellular radio frequency signals such as 2G/2.5G/3G/4G RF signals. The cellular radio 208 may be operable to receive wireless cellular RF signals from, for example, the BS 170a in the cellular network 170. In this regard, position information of a serving cellular base station such as the BS 170a indicated in the received cellular RF signals may be scanned as position samples and stored in the position sample database 214. Position samples may be scanned continuously, aperiodically, or periodically. The scanned position information of the BS 170a may comprise an actual position of the BS 170a and/or position related parameters such as, for example, a Cell ID, a base station ID, spectrum, and/or the strength of the received cellular RF signals.

The WiMAX radio 210 may comprise suitable logic, devices, interfaces and/or code that may be operable to transmit and receive wireless WiMAX radio frequency signals. The WiMAX radio 210 may be operable to receive WiMAX RF signals from, for example, the BS 180a in the WiMAX network 180. In this regard, position information of a serving WiMAX base station such as the BS 180a indicated in the received WiMAX RF signals may be scanned as position samples and stored in the position sample database 214. Position samples may be scanned continuously, aperiodically, or periodically. The scanned position information of the BS 180a may comprise actual position of the BS 180a and/or position related parameters such as, for example, a base station ID, spectrum, and/or the strength of the received WiMAX RF signals.

The FM radio 212 may comprise suitable logic circuitry, interfaces and/or code that may be operable to receive FM radio frequency signals from, for example, the broadcast tower 190a in the broadcast network 190. The received FM RF signals may comprise RDS data over FM bands. In this regard, position information for a broadcast tower such as the broadcast tower 190a indicated in the received broadcast RF signals may be scanned as position samples and stored in the position sample database 214. Position samples may be scanned continuously, aperiodically, or periodically. The scanned position information of the broadcast tower 190a may comprise actual position of the broadcast tower 190a and/or position related parameters such as, for example, a broadcast tower ID, spectrum, and/or the strength of the received broadcast RF signals The position sample database 214 may comprise suitable logic, circuitry, and/or code that may be operable to manage and store position samples scanned through various RF experiences of the mobile device 200. The stored position samples may be provided to the location server 120 to refine or update records of reference positions of corresponding reference position elements in the reference position database 120a.

The memory 216 may comprise suitable logic, circuitry, and/or code that may be operable to store information such as executable instructions and data that may be utilized by the processor 201 and/or other associated component units such as, for example, the GNSS radio 201. The memory 216 may comprise RAM, ROM, low latency nonvolatile memory such as flash memory and/or other suitable electronic data storage.

In operation, the processor 201 may be operable to manage and/or control operations of associated component units such as, for example, the GNSS radio 202, the WLAN radio 204, and the cellular radio 208 depending on corresponding usages. One or more associated radios such as, for example, the GNSS radio 204 and/or the cellular radio 208 may be activated or deactivated whenever it may be necessary to do so. The processor 201 may be operable to scan or capture position samples for various encountered reference position elements. The scanned position samples may comprise position information of the encountered reference position elements. The scanned position samples may be accumulated and stored in the position sample database 214. The processor 201 may be operable to communicate or report the stored position samples to the location server 120. The location server 120 may be operable to refine or update records for reference positions of the corresponding reference position elements in the reference position database 120a. With the GNSS radio 202 activated, the processor 201 may be operable to receive GNSS radio frequency (RF) signals directly from the GNSS satellites 140a-140c and utilize the received GNSS RF signals to calculate a position fix of the mobile device 110a. The processor 201 may be operable to communicate with the location server 120 for reference positions with up-to-date records in the reference position database 120a so as to achieve an accurate and fast position fix.

Figure 3:
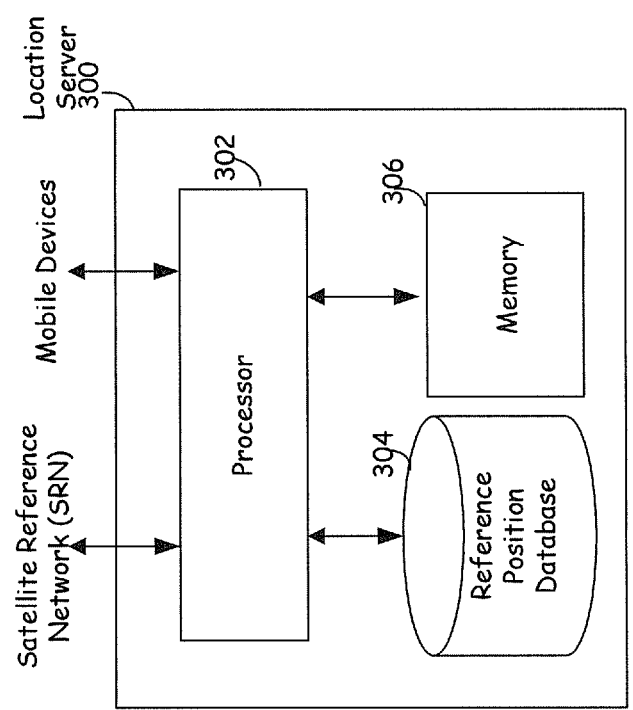
FIG. 3 is a block diagram illustrating an exemplary location server that is operable to dynamically update obsolete records for reference positions in a reference position database, in accordance with an embodiment of the invention.

FIG. 3 is a block diagram illustrating an exemplary location server that is operable to dynamically update obsolete records for reference positions in a reference position database, in accordance with an embodiment of the invention. Referring to FIG. 3, there is shown a location server 300. The location server 300 may comprise a processor 302, a reference position database 304 and a memory 306.

The processor 302 may comprise suitable logic, circuitry, interfaces and/or code that may be operable to manage and/or control operations of the reference position database 304 and the memory 306. The processor 302 may be operable to receive a plurality of position samples, periodically or aperiodically, from associated mobile devices such as the mobile device 110a. The received position samples comprise position information of reference position elements in the reference position database 304. The processor 302 may be operable to determine position status of corresponding reference position elements according to the received position samples. In this regard, the processor 302 may be operable to determine whether a position of a reference position element such as the AP 160a within the reference position database 120a may be changed, namely, removed or moved to different locations, according to characteristics of the corresponding position samples received. The processor 302 may be operable to adaptively select reference position elements in the reference position database 304 for mobile locating based on the determined position status. In instances where position samples for a reference position element such as the AP 160a in the reference position database 304 may not be received or reported within a certain time period, the processor 302 may consider that records for the position information of the AP 160a in the reference position database 304 are obsolete. In this regard, the processor 302 may not select the AP 160a as a reference position for mobile locating. The processor 302 may remove information for the AP 160a from the reference position database 304.

In instances where position samples for the AP 160a may indicate that the position information of the AP 160 is not reliable for use, the processor 302 may be operable to select other reference position elements with up-to-date position records, instead of the AP 160a, as reference positions for mobile locating. In this regard, information for the AP 160a may be removed from the reference position database 304 and/or marked with a low confidence level. In instances where the processor 302 may not accumulate enough position samples for the AP 160a within a certain time period, the processor 302 may determine that records for the position of the AP 160a in the reference position database 304 are obsolete. In this regard, the processor 302 may not use information for the AP 160a as a reference position for location based services and/or operations.

In instances where enough position samples for the AP 160a are received or reported within a certain time period and a geographic area for the position of the AP 160a may be indicated consistently by the received position samples, the processor 302 may determine that the AP 160a is located in a fixed position. In this regard, the AP 160a may be utilized as a reference position for mobile locating. In instances where enough position samples for the AP 160a are received or reported within a certain time period, but different geographic areas for the position of the AP 160a may be indicated in the received position samples, the location server 120 may consider that the AP 160a is moving. The processor 302 may be operable to update and/or refine the records for the position information of the AP 160a in the reference position database 304 according to the corresponding received position samples.

The reference position database 304 may comprise suitable logic, circuitry, and/or code that may be operable to store reference location information for associated communication devices. The stored reference location information may be provided to associated communication devices when need to support LBS service. The reference position database 304 may be operable to manage and update records for positions of reference position elements according to position samples reported from associated mobile devices such as the mobile devices 110a-110e.

The memory 306 may comprise suitable logic, circuitry, and/or code that may be operable to store information such as executable instructions and data that may be utilized by the processor 302 and/or other associated component units such as, for example, the reference position database 304. The memory 306 may comprise RAM, ROM, low latency nonvolatile memory such as flash memory and/or other suitable electronic data storage.

In an exemplary embodiment of the invention, the processor 302 may be operable to receive position samples from associated mobile devices such as the mobile device 110a. The received position samples may comprise position information of reference position elements in the reference position database 304. Position status of the reference position elements may be determined or identified according to corresponding received position samples. Records for reference positions in the reference position database 304 may be updated or refined according to the received position samples. A reference position element may be removed from the reference position database 304 if enough position samples are not received within a certain time period for the reference position element. Records of reference position in the reference position database 304 may be refined and/or updated according to the received position samples. Position status of reference position elements in the reference position database 304 may be determined according to the received position samples. Reference position elements in the reference position database 304 may be adaptively selected as reference positions for mobile locating based on the determined position status. Reference position elements with up-to-date position records may be used as reference positions to achieve an accurate and fast position fix for the mobile device 110a, for example.

Figure 4:
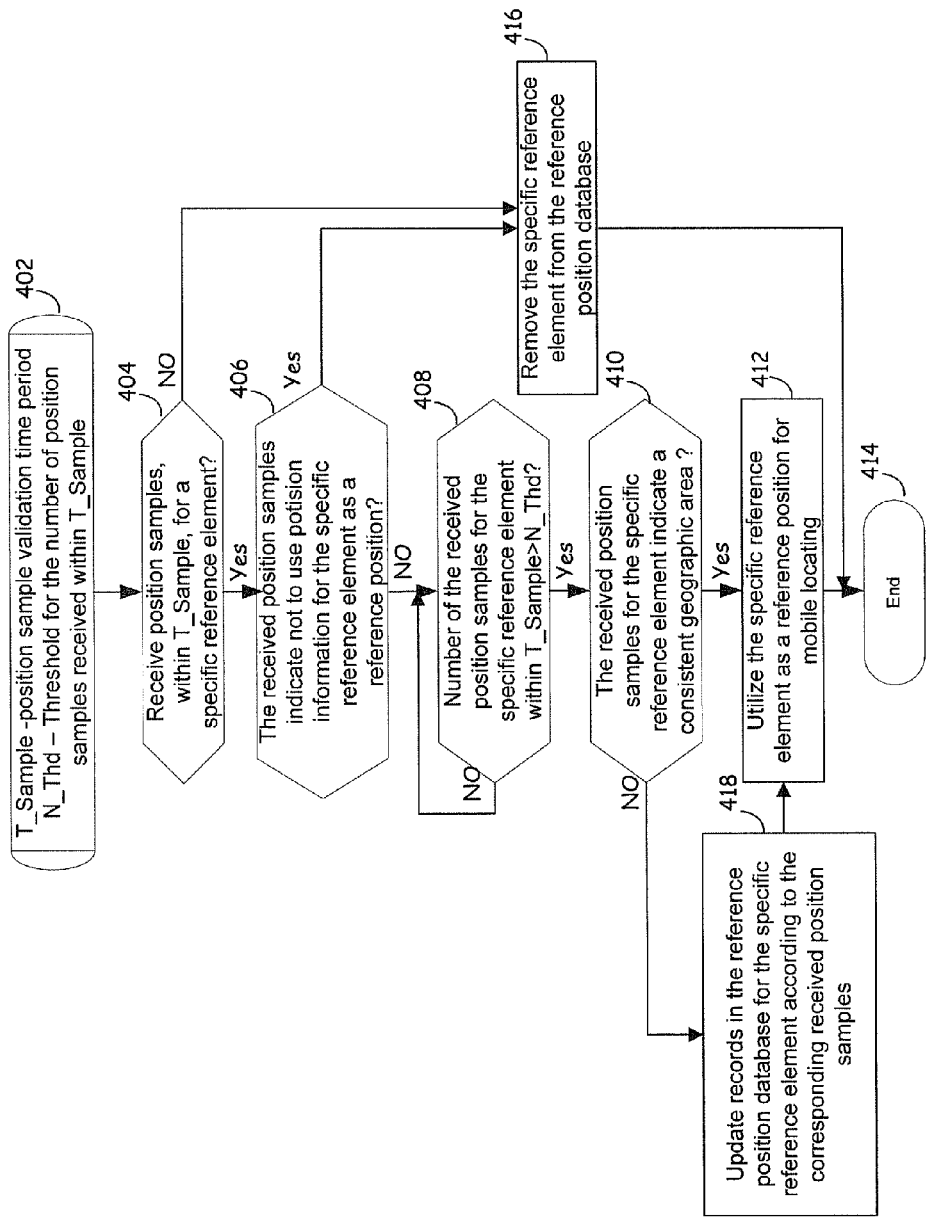
FIG. 4 is a flow chart illustrating an exemplary procedure for dynamically updating obsolete records for reference positions in a reference position database, in accordance with an embodiment of the invention.

FIG. 4 is a flow chart illustrating an exemplary procedure for dynamically updating obsolete records for reference positions in a reference position database, in accordance with an embodiment of the invention. Referring to FIG. 4, the exemplary steps may start with step 402. In step 402, a parameter T_Sample represents a position sample validation time period. A parameter N_Thd represents a threshold value for the number of position samples received within T_Sample. In step 404, the location server 300 may be operable to determine whether position samples for a specific reference position element such as the AP 160a may be received or reported within T_Sample. In instances where position samples for the AP 160a may be received or reported within T_Sample, the exemplary steps proceed to step 406. In step 406, it may be determined whether the received position samples for the AP 160a may indicate that the position information for the AP 160a should not be as a reference position for location based services and/or operations. In instances where the received position samples indicate to use the position information for the AP 160a as a reference position, the exemplary steps may proceed in step 408. In step 408, the location server 300 may be operable to determine whether the number of the position samples that are received within time period T_Sample for the AP 160a is greater than the threshold N_Thd. In instances where the position samples received within the time period T_Sample for the AP 160a is greater than the threshold N_Thd, the exemplary steps may proceed to step 410. In step 410, the location server 300 may determine whether the received position samples for the AP 160a indicates a consistent geographic area for the position of the AP 160a. In instances where the received position samples for the AP 160a indicate a consistent geographic area for the position of the AP 160a, then in step 412, the location server 300 may be operable to utilize the AP 160 as a reference position for mobile locating when need. The exemplary steps may end in step 414.

In step 404, in instances where position samples for the AP 160a may not be received or reported within the time period T_Sample, the exemplary steps may proceed to step 416. In step 416, the location server 300 may be operable to remove the AP 160a from the reference position database 304.

In step 406, in instances where the received position samples indicate not to use the position information for the AP 160a as a reference position, then the exemplary steps may proceed in step 416.

In step 410, in instances where the received position samples for the AP 160a indicate an inconsistent geographic area for the position of the AP 160a, the exemplary steps may proceed to step 418. In step 418, the location server 300 may be operable to refine and/or update the records for the position of the AP160a according to the received position samples for the AP 160a. The exemplary steps may continue in step 412.

Aspects of a method and system for updating obsolete records for reference positions in a reference position database are provided. In accordance with various embodiments of the invention, a mobile device such as the mobile device 110a may be operable to communicate position samples of one or more reference position with respect to one or more other communication device such as, for example, the AP 160a-160b, the BS 170a-170b, the BS 180a-180b and/or the broadcast tower 190a, to the location server 120. The location server 120 is operable to determine whether to utilize the one or more reference position in the reference position database 304, which is communicatively coupled to the location server 120, based on the communicated samples. The mobile device 110a may be operable to scan or capture the position samples of the one or more reference positions for the mobile device 110a with respect to the one or more other communication device such as, for example, the AP 160a-160b, the BS 170a-170b, the BS 180a-180b and/or the broadcast tower 190a, through encountered RF experiences. The scanned position samples may indicate position information of the one or more other communication device. The scanned position samples may also indicate whether the position information of the one or more other communication device is reliable for use. The mobile device 110a may be operable to accumulate the scanned position samples of the one or more reference positions and transmit the accumulated scanned position samples of the one or more reference positions to the location server 120 periodically or aperiodically.

The location server 120 may be operable to update records for the one or more reference positions with respect to the one or more other communication device in the reference position database 304 based on the accumulated position samples of the one or more reference positions. Based on the updated records, the location server 120 may be operable to determine whether to remove, use, and/or keep the one or more other communication device in the reference position database 304. The location server 120 may be also operable to determine whether the one or more other communication device in the reference position database 304 are fix-positioned or moving based on geographic information indicated in the received position samples for the updated records. For example, in instances where the received position samples for the one or more other communication device may indicate that corresponding position information is not reliable for use, the location server 120a may remove the one or more other communication device from the reference position database 304. In instances where not enough position samples for the one or more other communication device are received within a certain time period, the location server 120 may remove the one or more other communication device from the reference position database 304. In instances where there are enough position samples for the one or more other communication device are received within a certain time period, the location server 120 may remove and/or reduce a confidence level for the one or more corresponding other communication device from the reference position database 304. Furthermore, the location server 120 may be operable to determine whether the one or more other communication device in the reference position database 304 are fix-positioned or moving based on geographic information indicated in the received position samples for the updated records. The updated records may be utilized for location based services or operations, for example, to determine a fast position fix for associated mobile devices such as the mobile device 110a.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for updating obsolete records for reference positions in a reference position database.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
    receiving, at a location server, a first plurality of position samples from a first mobile device and a second plurality of position samples from a second mobile device;
    extracting a first position of a communication device from the first plurality of position samples and a second position of the communication device from the second plurality of position samples;
    determining whether the first plurality of position samples are reliable based on whether a threshold number of the first plurality of position samples were received within a predetermined time period;
    determining whether the second plurality of position samples are reliable based on whether a threshold number of the second plurality of position samples were received within the predetermined time period; and
    prioritizing, at the location server, the first position over the second position in a position database when the first plurality of position samples are reliable and the second plurality of position samples are not reliable.

2. The method according to claim 1, further comprising:
    indicating, at the location server, that the first position is reliable and that the second position is not reliable.

3. The method according to claim 1, further comprising:
    extracting, from the first plurality of position samples, a position of the first mobile device relative to the communication device; and
    extracting, from the second plurality of position samples, a position of the second mobile device relative to the communication device.

4. The method according to claim 1, wherein prioritizing comprises:
    removing the second position of the second mobile device from the position database.

5. The method according to claim 3, further comprising:
    determining whether the communication device is a mobile communication device.

6. The method according to claim 3, further comprising:
    removing the communication device from the position database based on the first and second plurality of position samples.

7. A system, comprising:
    a position database; and
    a location server, coupled to the position database, configured to:
        receive position samples from a mobile device;
        extract a position of a communication device from the position samples and a determination of a reliability of the position, wherein the position is determined to be reliable when a threshold number of the position samples indicating the position of the communication device are received within a predetermined time period; and
        prioritize the position relative to other positions stored in the position database based on whether the position is determined to be reliable.

8. The system according to claim 7, wherein the communication device is an access point.

9. The system according to claim 7, wherein the location server is further configured to remove the position from the position database when the position is determined to be not reliable.

10. The system according to claim 7, wherein the location server is further configured to determine whether the communication device is mobile.

11. The system according to claim 7, further comprising:
    a receiver, coupled to the location server, configured to receive at least one of Worldwide Interoperability for Microwave Access (WiMAX) or WiFi signals.

12. The system according to claim 7, wherein the location server comprises:
    a satellite radio network coupled to the location server.

13. The system according to claim 7, wherein the location server is further configured to periodically update records in the position database.

14. The system according to claim 7, wherein the location server is further configured to update records in the position database in response to a request.

15. The system according to claim 7, wherein the location server is further configured to mark records in the position database as obsolete when a reliable position has not been received within the predetermined time period.

16. The system according to claim 7, wherein the location server is further configured to determine whether the communication device is mobile by comparing the position to a prior position of the communication device.

17. The system according to claim 7, wherein the location server is configured to use the communication device as a reference for a location determination of a second mobile device when the position is determined to be reliable.

18. A system, comprising:
    a position database storing a plurality of records for a reference position; and a location server, coupled to the position database, configured to:
    receive, from a mobile device, a plurality of position samples for the reference position;
    determine that the plurality of position samples are reliable if:
        a number of position samples in the plurality of position samples that were received within a predetermined period of time is greater than a threshold number; and
        the plurality of position samples indicate a consistent geographic area; and
    update the plurality of records for the reference position based on the plurality of position samples if the location server determined that the plurality of position samples are reliable.

19. The system of claim 18, wherein the location server is further configured to:
    determine whether the plurality of position samples were received within the predetermined period of time; and
    remove the reference position from the position database if the plurality of position samples were not received within the predetermined period of time.

20. The system of claim 18, wherein the location server is further configured to:
    use the updated plurality of records to locate a second mobile device.

21. The system of claim 18, wherein the location server is further configured to:
    prioritize a record corresponding to the plurality of position samples in the position database if the location server determined that the plurality of position samples are reliable.

* * * * *